(12) United States Patent
Lee et al.

(10) Patent No.: US 12,120,284 B2
(45) Date of Patent: Oct. 15, 2024

(54) IMAGE ENCRYPTION METHOD USING LINE INTERLACING AND IMAGE DECRYPTION APPARATUS THEREFOR

(71) Applicant: Korea Advanced Institute of Science and Technology, Daejeon (KR)

(72) Inventors: Heung Kyu Lee, Daejeon (KR); Sang Keun Ji, Daejeon (KR); Ji Hyeon Kang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 383 days.

(21) Appl. No.: 17/710,064

(22) Filed: Mar. 31, 2022

(65) Prior Publication Data

US 2022/0321736 A1    Oct. 6, 2022

(30) Foreign Application Priority Data

Mar. 31, 2021 (KR) .......... 10-2021-0041748
Feb. 25, 2022 (KR) .......... 10-2022-0025051

(51) Int. Cl.
*H04N 1/44* (2006.01)
*G06T 1/00* (2006.01)

(52) U.S. Cl.
CPC ......... *H04N 1/4486* (2013.01); *G06T 1/0021* (2013.01)

(58) Field of Classification Search
CPC .......... H04N 1/4486; G06T 1/0021
See application file for complete search history.

(56) References Cited

U.S. PATENT DOCUMENTS

2004/0223612 A1* 11/2004 Kamijoh .......... G06T 1/0085
375/E7.258

OTHER PUBLICATIONS

Office Action issued on Sep. 8, 2023, in corresponding Korean Application No. 10-2022-0025051, 12 pages.
Ji et al., "Image Recapture Prevention Using Secure Display Schemes on Polarized 3D System", IEEE Transactions on Circuits and Systems for Video Technology, 2018, vol. 29, No. 8, 16 pages.
Ji, "Image Encryption Techniques to Prevent Image Recapture on Polarized 3D System", Korea Advanced Institute of Science and Technology, 2020, 93 pages.

* cited by examiner

*Primary Examiner* — Christopher Wait
(74) *Attorney, Agent, or Firm* — Maier & Maier, PLLC

(57) ABSTRACT

An image encryption method. The method includes generating an adjusted secret image by adjusting an intensity range to be the same for each RGB channel of a secret image; generating a modulated image by repeating pixel modulation in block units on the adjusted secret image; and generating an interlaced image by interlacing odd-numbered lines of the adjusted secret image with even-numbered lines of the modulated image or interlacing even-numbered lines of the adjusted secret image with odd-numbered lines with the modulated image.

20 Claims, 17 Drawing Sheets

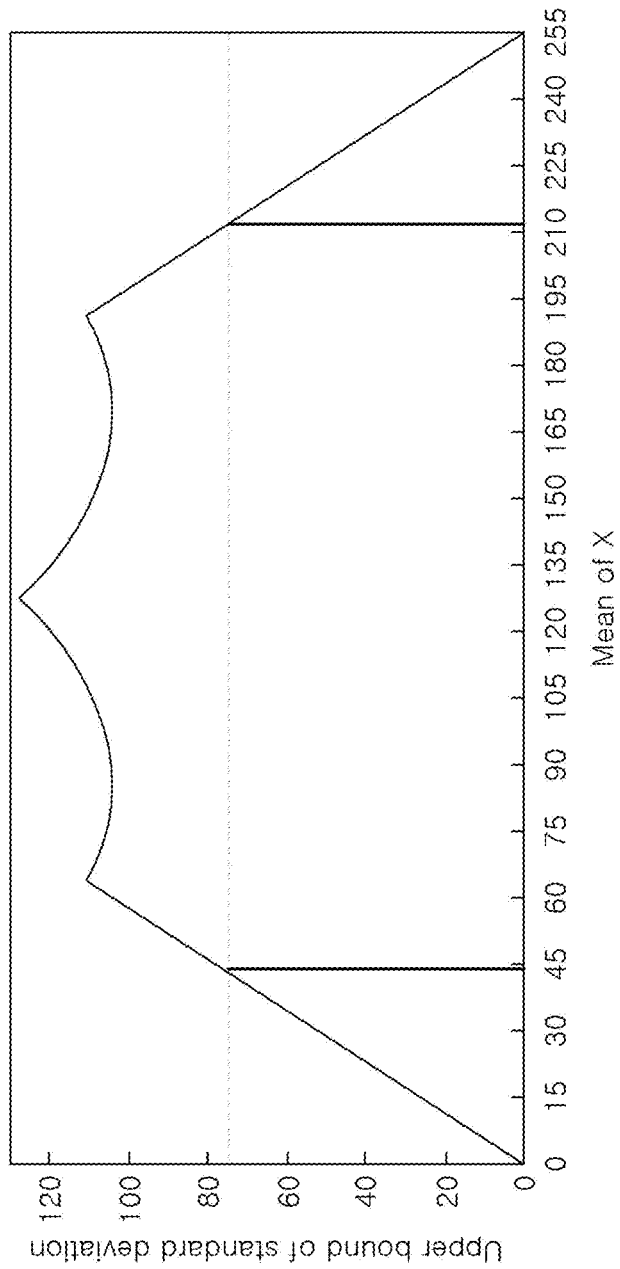

*FIG.11C*   *FIG.11D*
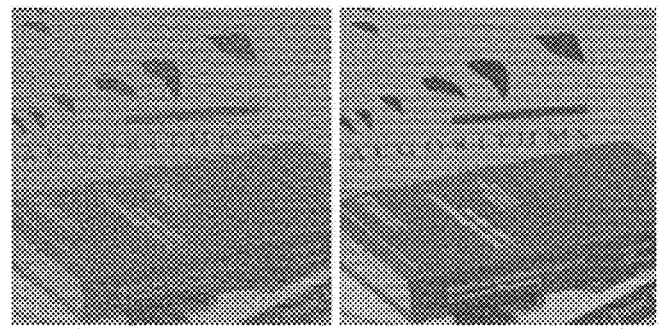
*FIG.11E*   *FIG.11F*
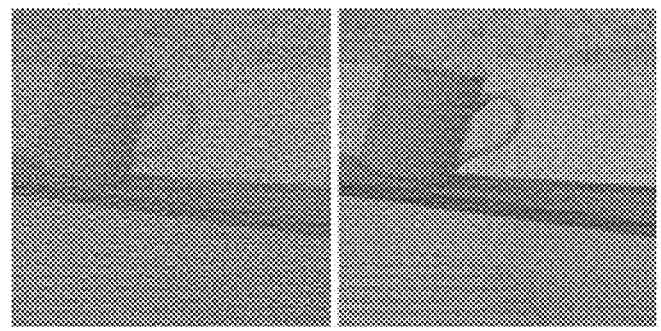

IMAGE ENCRYPTION METHOD USING LINE INTERLACING AND IMAGE DECRYPTION APPARATUS THEREFOR

CROSS-REFERENCE TO RELATED APPLICATIONS

This application claims priority to Korean Patent Application No. 10-2021-0041748, filed on Mar. 31, 2021 and Korean Patent Application No. 10-2022-0025051, filed on Feb. 25, 2022. The entire contents of the application on which the priority is based are incorporated herein by reference.

TECHNICAL FIELD

The present disclosure relates to an image encryption method based on the line interlacing characteristics and an image decryption apparatus decrypting an encrypted image based on the method.

BACKGROUND

With the rapid development of imaging devices and widespread use of the Internet, illegal leakage of recaptured digital content is becoming a problem. High-quality digital content may be readily leaked without the consent of a copyright holder of digital content using an imaging device recapturing a display on which the digital content is being projected. Once recaptured content is illegally distributed over the Internet, it is almost impossible to protect the copyright. Since recapturing using an imaging device is conducted outside of a computer system, unlike the screenshot that captures the display within the computer system, it isn't easy to control or prevent the recapturing. Therefore, there is a need for a scheme capable of preventing unauthorized recapturing using an imaging device.

Three methods have been proposed to protect the copyright of content from illegal leakage by recapturing: digital watermarking, image recapture detection, and image recapture prevention. First, digital watermarking inserts a watermark conveying copyright information into the content and verifies the copyright of the content by detecting the watermark from the recaptured content. Second, image recapture detection controls the distribution of recaptured content by determining whether suspicious images have been obtained from recapture using traces generated during the recapture process.

However, the two methods intend to protect copyright after content is leaked and are unable to prevent the recapture itself completely. Finally, the image recapture prevention scheme protects content from an illegal leak by impeding or preventing recapture of the content projected on a display using an imaging device under a specific setting, such as a security film, an image encryption-based scheme, an infrared device-based scheme, a software-based scheme, and a 3D display-based scheme. However, these schemes are limited in that they prevent image recapture partially or limitedly due to limited operating conditions. Therefore, a scheme is needed to prevent illegal content leakage due to recapture using an imaging device.

SUMMARY

An object of the present disclosure is to provide an image encryption method generating an interlaced image in which a secret image is encrypted based on line interlacing characteristics.

In addition, an object of the present disclosure is to provide an apparatus for decrypting a secret image encrypted in the interlaced image based on the line interlacing characteristics.

In accordance with an aspect of the present disclosure, there is provided an image encryption method. The method comprises, generating an adjusted secret image by adjusting an intensity range to be the same for each RGB channel of a secret image; generating a modulated image by repeating pixel modulation in block units on the adjusted secret image; and generating an interlaced image by interlacing odd-numbered lines of the adjusted secret image with even-numbered lines of the modulated image or interlacing even-numbered lines of the adjusted secret image with odd-numbered lines with the modulated image.

Herein, the generating the adjusted secret image by adjusting the intensity range adjusts the range of a pixel value to have the same distance of intensity strength from the expectation value of a probabilistic variable representing the pixel value of the secret image.

Herein, the generating the modulated image comprises, calculating pixel values of a particular block located within a preconfigured range in the adjusted secret image; and performing pixel modulation for each block of the adjusted secret image based on the pixel values of the particular block.

Herein, the performing pixel modulation for each block of the adjusted secret image performs pixel modulation on each block so that the average value of pixel values of any block located within a preconfigured range falls within a target average range.

The method further comprises generating an adjusted public image by adjusting an intensity range to be the same for each RGB channel of the public image, wherein the generating the modulated image generates the modulated image by repeating pixel modulation in block units on the adjusted secret image and the adjusted public image.

Herein, the public image is an image to which an image enhancement scheme has been applied to enhance edge components.

Herein, the generating the modulated image comprises generating a second modulated image with enhanced image quality by applying an inverse error diffusion scheme to a previously generated, first modulated image.

Herein, when the intensity range is adjusted, the range of a pixel value is adjusted by considering correlation between intensity strength of the secret image and intensity strength of the public image.

Herein, the generating the modulated image comprises, calculating pixel values of a particular block located within a preconfigured range in the adjusted secret image and the adjusted public image; and performing pixel modulation for each block of the adjusted secret image and the adjusted public image based on the pixel values of the particular block.

Herein, the performing pixel modulation for each block of the adjusted secret image and the adjusted public image performs pixel modulation on each block so that the average value of pixel values of any block located within a preconfigured range falls within a target average range.

In accordance with another aspect of the present disclosure, there is provided an image decryption apparatus. The apparatus comprises a decryption screen disposed between an encryption object including an interlaced image and a viewing position, wherein the interlaced image is generated by generating an adjusted secret image by adjusting an intensity range to be the same for each RGB channel of a secret image; generating a modulated image by repeating pixel modulation in block units on the adjusted secret image; and interlacing odd-numbered lines of the adjusted secret image with even-numbered lines of the modulated image or interlacing even-numbered lines of the adjusted secret image with odd-numbered lines with the modulated image.

Herein, the decryption screen decrypts the adjusted secret image encrypted by even-numbered lines or odd-numbered lines of the interlaced image.

Herein, the decryption screen comprises a mask that prevents viewing at a position corresponding to an even-numbered line or an odd-numbered line of the interlaced image.

Herein the mask comprises a polarization filter or a light blocking filter.

Herein, after further generating an adjusted public image by adjusting an intensity range to be the same for each RGB channel of a public image, the modulated image is generated by repeating pixel modulation in block units on the adjusted secret image and the adjusted public image.

Herein, the decryption screen decrypts the adjusted secret image encrypted by even-numbered lines or odd-numbered lines of the interlaced image.

Herein the decryption screen comprises a mask that prevents viewing at a position corresponding to an even-numbered line or an odd-numbered line of the interlaced image.

Herein, the mask comprises a polarization filter or a light blocking filter.

In accordance with still another aspect of the present disclosure, there is provided a computer-readable storage medium including computer executable instructions, wherein the instructions, when executed by a processor, cause the processor to perform an image encryption method, the method comprising: recording medium storing a computer program, wherein the computer program, when being executed by a processor, comprising: generating an adjusted secret image by adjusting an intensity range to be the same for each RGB channel of a secret image; generating a modulated image by repeating pixel modulation in block units on the adjusted secret image; and generating an interlaced image by interlacing odd-numbered lines of the adjusted secret image with even-numbered lines of the modulated image or interlacing even-numbered lines of the adjusted secret image with odd-numbered lines with the modulated image.

Herein, the image decryption method further comprises generating an adjusted public image by adjusting an intensity range to be the same for each RBG channel of a public image, wherein the generating the modulated image generates the modulated image by repeating pixel modulation in block units on the adjusted secret image and the adjusted public image. Unlike previous schemes that express only a limited number of colors, require a color analyzer, or generate a distortion such as noise, the image encryption method based on line interlacing characteristics according to one embodiment of the present disclosure is a software-based scheme capable of expressing a rich set of colors of an image while minimizing the quality deterioration of the secret image.

In addition, the image encryption method based on line interlacing characteristics according to one embodiment of the present disclosure may control the right of viewing a secret image using polarized glasses in a polarized 3D system and decrypt the secret image using masking even from paper such as an identification card, a banknote, and a document.

In addition, compared with the prior art, such as a document identification number, a voice barcode, and an authenticity check barcode used to verify the authenticity of a document in public offices, the present disclosure provides the following effect. The prior art requires separate system access or an expensive scanner device. However, an embodiment of the present disclosure allows real-time authenticity verification and authentication of identification cards, passports, banknotes, and documents through a low-cost and simple masking-based image encryption technique. In addition, since secret images and public images are encrypted based at the pixel level through image encryption, a synchronization failure occurs at the time of the attack, such as scanning and copying encrypted images. Accordingly, the present disclosure provides an effect of verifying the integrity of a document.

BRIEF DESCRIPTION OF THE DRAWINGS

FIG. 5 shows an upper bound of the standard deviation with respect to the average for adjusting an intensity range in the restricted viewing scheme of an image encryption method based on line interlacing characteristics according to one embodiment of the present disclosure.

FIGS. 11A-11F show examples of an effect obtained by applying inverse error diffusion in the selective viewing scheme of an image encryption method based on line interlacing characteristics according to yet another embodiment of the present disclosure.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

To describe image encryption and decryption based on the line interlacing characteristics, the present disclosure exemplifies interlacing odd-numbered lines (or even-numbered lines) of the first image with even-numbered lines (or odd-numbered lines) of the second image. Here, the line may be any line that virtually extends at least part of pixels in the related image in a row direction, in a column direction, or in a diagonal direction. Among the lines, descriptions will be given primarily based on an example in which lines are virtually extending at least part of the pixels in the related image in a row direction.

Figure 1:
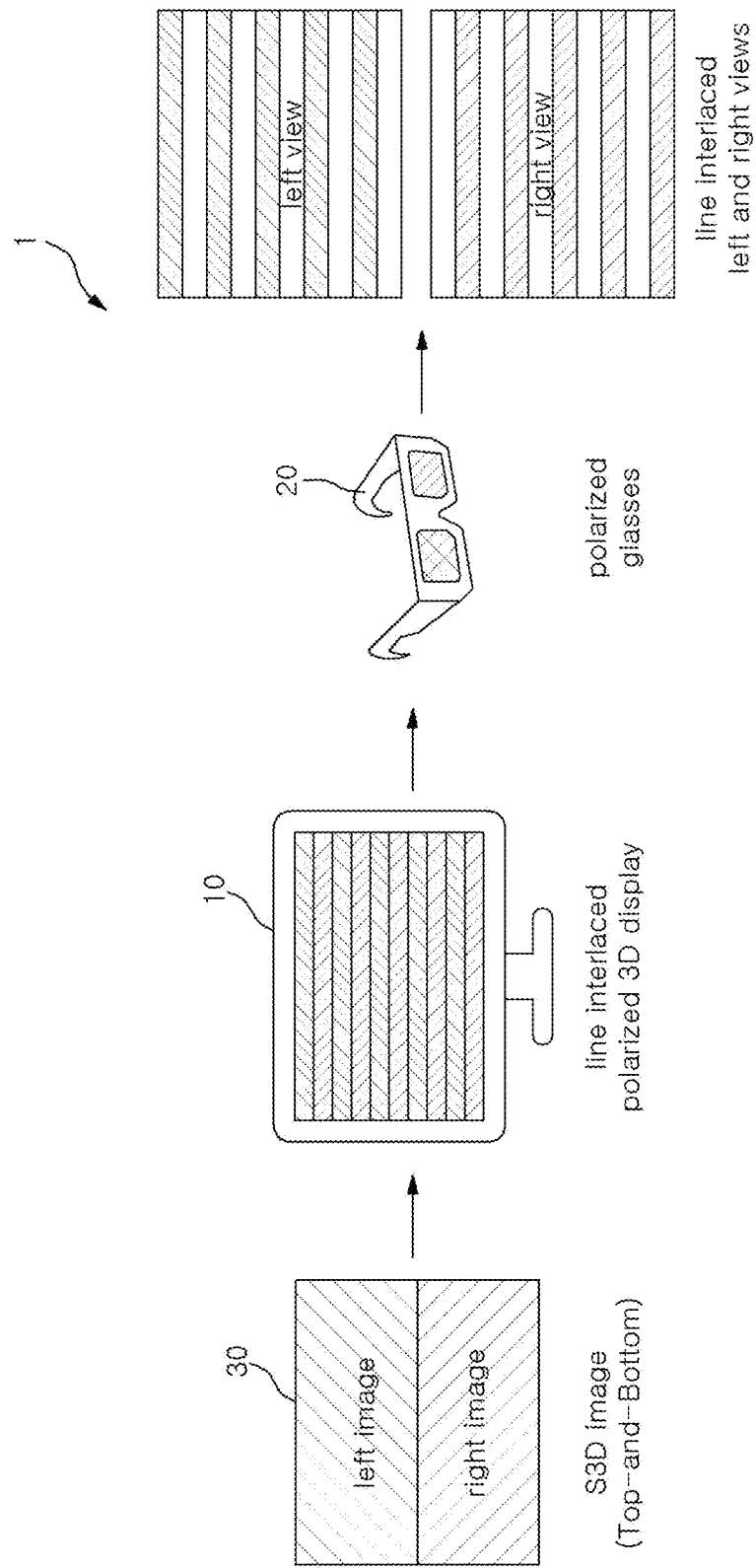
FIG. 1 illustrates the structure of a polarized 3D system according to one embodiment of the present disclosure.

FIG. 1 illustrates the structure of a polarized 3D system according to one embodiment of the present disclosure.

An image encryption method based on line interlacing characteristics according to one embodiment of the present disclosure relates to an image encryption method using line interlacing capable of preventing recapturing a color image. According to one embodiment of the present disclosure, the image encryption method may be implemented in a commercial polarized 3D system 1 without involving additional hardware and prevent illegal content leakage due to image recapture using an imaging device.

An image encryption method based on line interlacing characteristics according to one embodiment of the present disclosure may include two types of security display schemes: a restricted viewing scheme (RVS) and a selective viewing scheme (SVS).

Both schemes are pixel-level encryption schemes that incapacitate the Gestalt theory, making it impossible to extract information on a secret image from an image obtained by recapturing a display.

In the RVS, an interlaced image concealing a secret image therein is viewed as meaningless noise, while, in the SVS, an improved scheme of the RVS, an interlaced image is viewed as a meaningful public image. In both schemes, a concealed secret image is visible only to authorized users wearing polarized glasses. Unlike previous schemes that express only a limited number of colors, require a color analyzer, or generate a distortion such as noise, the proposed scheme is a software-based scheme capable of expressing a rich set of colors of an image while minimizing the quality deterioration of the secret image.

Through the proposed method, it is possible to visually and statistically conceal a secret image while distortions of the secret image are kept to a minimum and make it impossible to extract the secret image from a recaptured image. In addition, the image encryption method based on line interlacing characteristics according to one embodiment of the present disclosure may control the right of viewing a secret image using polarized glasses in a polarized 3D system and decrypt the secret image using masking even from paper such as an identification card, a banknote, and a document.

In the present disclosure, the restricted viewing scheme of the image encryption method based on line interlacing characteristics according to one embodiment of the present disclosure will be described with reference to FIGS. 3 to 7D below, and the selective viewing scheme of the image encryption method based on line interlacing characteristics according to another embodiment of the present disclosure will be described with reference to FIGS. 8 to 12D below.

Referring to FIG. 1, a polarized 3D system 1 according to one embodiment of the present disclosure includes a 3D display 10, polarized glasses 20, and stereoscopic 3D (S3D) content 30.

The stereoscopic 3D (S3D) content 30 is composed of left-eye and right-eye images, and the two images are interlaced on a line-by-line basis and projected on a 3D display. The display area is divided into odd- and even-numbered rows, and a clockwise circular polarization filter and a counterclockwise circular polarization filter are disposed on the odd- and even-numbered rows, respectively. A circular polarization filter converts natural light into circularly polarized light, which blocks light waves of other polarization directions and lets light waves of the same polarization pass through. Finally, clockwise and counterclockwise circular polarization filters are disposed on the two lenses of the polarized glasses. Accordingly, the left- and right-eye images are circularly polarized in different directions through the two circular polarization filters to be projected on the display, and the projected images are separated onto both eyes through the polarized glasses 20.

The polarized glasses 20 according to one embodiment of the present disclosure include circular polarization filters in the same polarization direction. The polarized glasses 20 identify a secret image concealed in the odd-numbered rows of an interlaced image.

The polarized glasses 20 will be described in detail with reference to FIGS. 2A and 2B below.

Figure 2A:
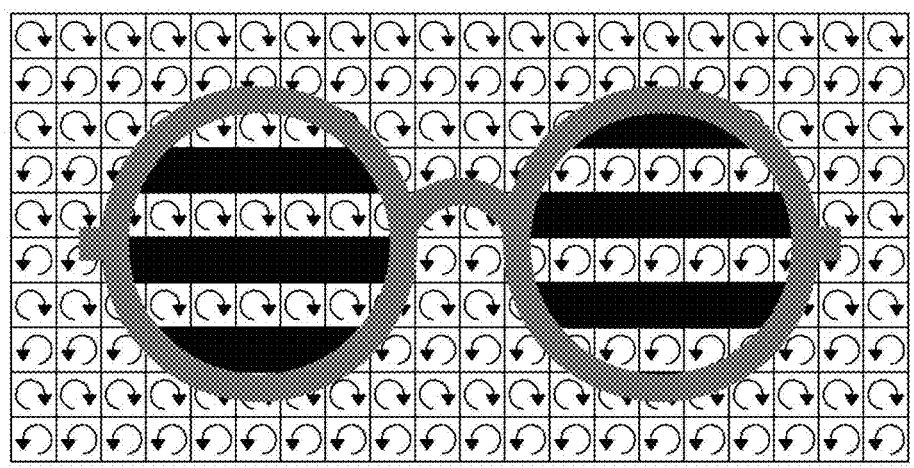
FIGS. 2A and 2B show examples views seen through polarized glasses in a typical polarized 3D system and a polarized 3D system for preventing imaging recapture according to one embodiment of the present disclosure.
Figure 2B:
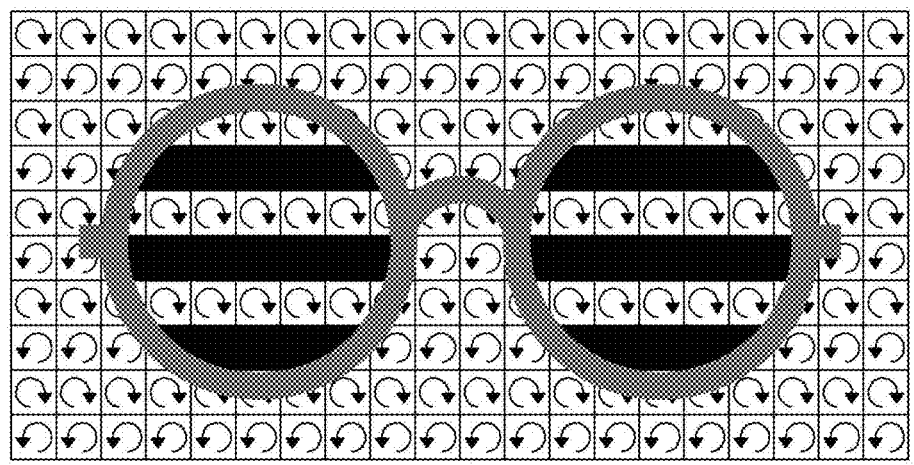

FIGS. 2A and 2B show example views seen through polarized glasses in a typical polarized 3D system and a polarized 3D system for preventing imaging recapture according to one embodiment of the present disclosure.

The existing image encryption methods based on line interlacing characteristics assume that two circular polarization filters in clockwise and counterclockwise directions are disposed in odd- and even-numbered rows of a display, respectively, as shown in FIG. 2A. In addition, it is assumed that two circular polarization filters are disposed on the left and right lenses of the polarized glasses, respectively. Accordingly, the left eye may see only odd-numbered rows of an interlaced image, and the right eye only even-numbered rows. Therefore, a viewer may enjoy 3D content by perceiving a binocular difference between the left- and right-eye images from a single display.

L and R are defined as left-eye and right-eye images having a size of (h×w), respectively. Also, $L_h$ and $R_h$ are defined as images with a size of (h/2×w) halved in the vertical direction from L and R, respectively. I is defined as an image in which $L_h$, and $R_h$ are interlaced line by line in the vertical direction; $I_o$ and $I_e$ are defined as images composed of odd- and even-numbered rows of I, respectively. If the inter operator is denoted by //, I may be defined as shown in Eq. 1.

$$I = L_h // R_h = I_o // I_e.$$ [Eq. 1]

$f_{CW}(I)$ and $f_{CCW}(I)$ are defined as views of I seen through the circular polarization filters $f_{CW}$ and $f_{CCW}$ in the clockwise and counterclockwise directions, respectively and are defined by Eq 2 below.

$$f_{cw}(I) = I_o // B \approx L,$$

$$f_{ccw}(I) = B // I_e \approx R,$$ [Eq. 2]

In Eq. 2, B represents a black image with a size of (h/2×w). Therefore, a glasses view $V_g$ and a non-glasses view $V_{ng}$ of I may be expressed by Eq. 3 below.

$$V_g = \{V_g^L, V_g^R\} = \{f_{cw}(I), f_{ccw}(I)\},$$

$$V_{ng} = I,$$ [Eq. 3]

In Eq. 3, $V_g^L$ and $V_g^R$ represent the views through the left and right lenses of the polarized glasses, respectively.

The polarized glasses 20 in the polarized 3D system for image recapture prevention according to one embodiment of the present disclosure modifies existing polarized 3D systems for viewing 3D content to prevent image recapture.

A polarized 3D system is used to conceal a secret image in the interlaced image and to view the secret image in the interlaced image through the polarized glasses 20. Therefore, the polarized 3D system is changed to be composed of circular polarization filters in the same polarization as shown in FIG. 2B.

FIGS. 2A and 2B assume that the modified polarized glasses are composed of only clockwise circular polarization filters, $f_{cw}$, but the present disclosure is not limited to the assumption.

In a modified polarized 3D system, a glasses view, $V_g$, may be expressed by Eq. 4.

$$V_g = V_g^L = V_g^R = f_{cw}(I).$$ [Eq. 4]

Figure 4:
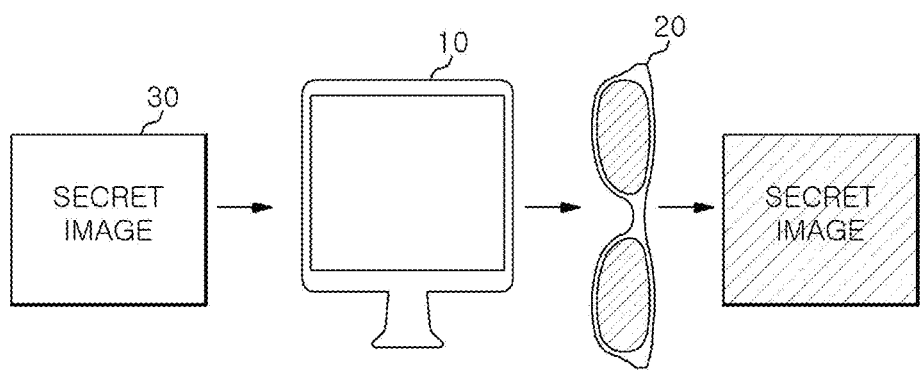
FIG. 4 illustrates a restricted viewing scheme of an image encryption method based on line interlacing characteristics according to one embodiment of the present disclosure.
Figure 9:
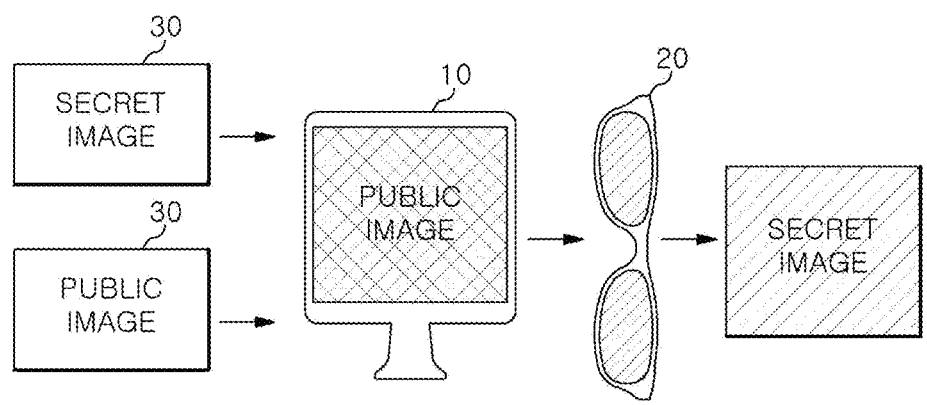
FIG. 9 illustrates a selective viewing scheme of an image encryption method based on line interlacing characteristics according to yet another embodiment of the present disclosure.

Accordingly, as shown in FIG. 2B and the following FIGS. 4 and 9, the secret image concealed in the odd-numbered rows of an interlaced image may be viewed through modified polarized glasses. Also, an effect similar to that from polarized glasses may be obtained by generating a mask in which odd-numbered rows are transparent or empty, and even-numbered rows are masked in black color. Therefore, the same conditions may be implemented using the masking scheme not only for a polarized 3D system but also for paper such as an identification card, a banknote, and a document.

Although FIG. 2B illustrates a case in which a secret image concealed in odd-numbered rows of an interlaced image may be viewed, the present disclosure is not limited to the specific case, and a secret image concealed in either odd- or even-numbered rows may be viewed.

Figure 3:
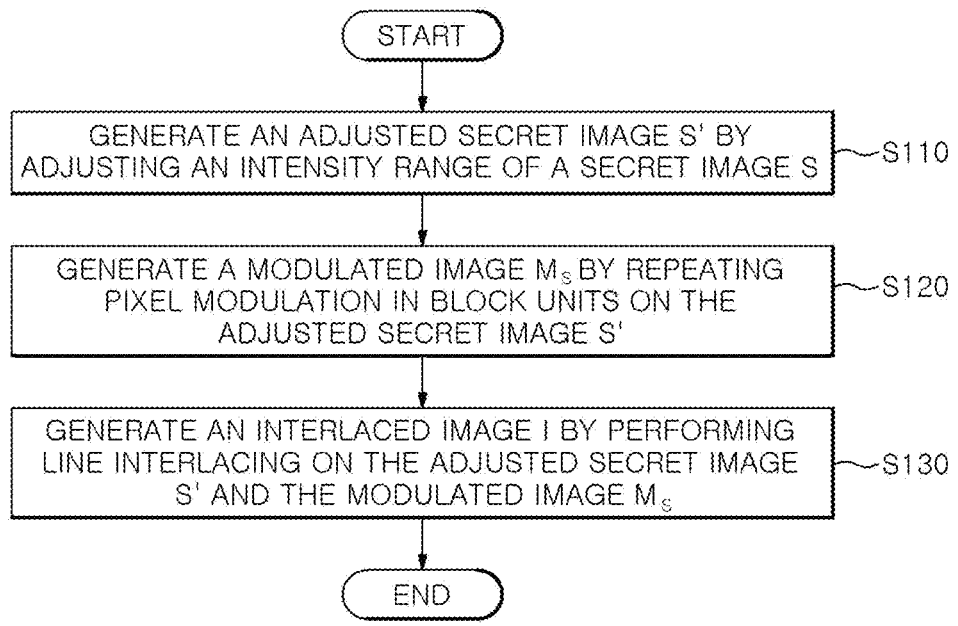
FIG. 3 is a flow diagram illustrating a method for image encryption based on line interlacing characteristics according to one embodiment of the present disclosure.

FIG. 3 is a flow diagram illustrating a method for image encryption based on line interlacing characteristics according to one embodiment of the present disclosure.

FIG. 3 relates to an encryption method using a restricted viewing scheme. Referring to FIG. 3, a processor performs an image encryption method based on line interlacing characteristics according to one embodiment of the present disclosure, where the method generates, at the S110 step, an adjusted secret image S' by adjusting the intensity range to be the same for each RGB channel of the secret image S.

Here, the generating an adjusted secret image S' by adjusting the intensity range S1110 adjusts the range of a pixel value to have the same distance of intensity strength t from the expectation value E of a probabilistic variable representing the pixel value of the secret image S.

In the S120 step, pixel modulation is applied to the adjusted secret image S' in block units to generate a modulated image $M_S$.

Here, the generating the modulated image $M_S$ S120 calculates pixel values of a particular block located within a preconfigured range in the adjusted secret image S' and performs pixel modulation for each block of the adjusted secret image S' based on the pixel values of the particular block.

Specifically, pixel modulation is performed on each block so that the average value of pixel values of any block located within a preconfigured range falls within a target average range.

In the S130 step, odd- or even-numbered rows of the adjusted secret image S' are interlaced with even- or odd-numbered rows of the modulated image $M_S$ to generate an interlaced image I.

The restricted viewing scheme will be described in more detail with reference to FIG. 4 below.

FIG. 4 illustrates a restricted viewing scheme of an image encryption method based on line interlacing characteristics according to one embodiment of the present disclosure.

In the RVS, when viewed without wearing glasses, an image concealing a secret image is seen as meaningless noise. In the RVS, the secret image is viewed restrictively through polarized glasses. Therefore, as shown below, a non-glasses view $V_{ng}$ approximates a random image R obtained by interlacing an adjusted secret image S' and a modulated image $M_S$, and a glasses view $V_g$ approximates the secret image S, which are expressed by Eq. 5 below.

$$V_{ng} = S' // M_s \approx R,$$

$$V_g = S' // B \approx S,$$ [Eq. 5]

In Eq. 5, R represents a random image in which pixel values follow the uniform distribution.

In a restricted viewing condition, the restricted viewing scheme assumes that the statistical characteristics of an interlaced image should be similar to those of a random image R following the uniform distribution. The average $\mu_R$ and standard deviation $\sigma_R$ of a pixel value of R are calculated by Eq. 6.

$$\mu_R = \sum_{i=0}^{255} \{x_i \cdot Pr(x_i)\},\ \sigma_R = \sqrt{\sum_{i=0}^{255} \{(x_i - \mu_R)^2 \cdot Pr(x_i)\}},$$ [Eq. 6]

In Eq. 6, $x_i$ represents the pixel value having a value of i. $P_r(x)$ represents the probability mass function of x, and since $x_i$ follows the uniform distribution, all of $x_i$ have the same value.

To adjust the distribution of the interlaced image I, $I_o$ and $I_e$ have to be adjusted. According to one embodiment of the present disclosure, the adjustment is performed in block units to follow the target distribution.

I having a size of (h×w) is divided into blocks of size (2m×n) in a non-overlapping fashion, which is denoted by $B_I$. Blocks having a size of (m×n) composed of odd- and even-numbered rows out of $B_I$ are denoted by $B_o$ and $B_e$, respectively. X is defined to be a probabilistic variable representing a pixel value ranging from 0 to 255, and pixel values of block $B_I$, $B_o$, and $B_e$ are denoted by $X_I$, $X_o$, and $X_e$, respectively. Then the average of $X_I$, $\overline{X}_I$, and the standard deviation of $X_I$, $\sigma_I$ may be expressed by Eq. 7 as follows.

$$\overline{X}_I = \frac{1}{2}\{\overline{X}_o + \overline{X}_e\}, \quad [\text{Eq. 7}]$$

$$\sigma_I = \sqrt{\frac{1}{2}\{\sigma_o^2 + \sigma_e^2 + (\overline{X}_o - \overline{X}_I)^2 + (\overline{X}_e - \overline{X}_I)^2\}},$$

In Eq. 7, $\overline{X}$ represents the average of x, and $\sigma_o$ and $\sigma_e$ represent the standard deviations of $X_o$ and $X_e$, respectively. Therefore, the distribution of $X_I$ has to follow the distribution of R as shown in Eq. 8.

$$X_I \sim (\mu_R, \sigma_R^2). \quad [\text{Eq. 8}]$$

As described above, to adjust the distribution of $X_I$, $X_o$ and $X_e$ have to be adjusted. Therefore, to conceal a secret image while minimizing modification of $X_o$ that expresses the secret image, $X_e$ has to be generated to construct $X_I$.

To this purpose, the intensity range is adjusted to have the same range for each RGB channel of the secret image S through intensity adjustment.

The lower bound of the standard deviation of pixel values, $\sigma_x$, is 0, which is the case where all of the pixels have the same value, while the upper limit is calculated by Eq. 9 below.

$$U(\sigma_X) = \sqrt{(\max X - \mathbb{E}[X])(\mathbb{E}[X] - \min X)}, \quad [\text{Eq. 9}]$$

In Eq. 9, E represents the expectation value. Considering the pixel value range, an upper bound, which is more conservative than the value expressed by Eq. 9, may be calculated by Eq. 10 below.

$$U(\sigma_X; \overline{X}) = \sqrt{\max \overline{X^2} - \overline{X}^2}, \quad [\text{Eq. 10}]$$

In Eq. 10, $$\max \overline{X^2} = \frac{\lfloor \overline{X} \cdot N/\max X \rfloor \cdot \max X^2 + \{(\overline{X} \cdot N) \bmod \max X\}^2}{N}.$$

In Eq. 10, N represents the size of a block, and mod represents the modulo operator. The upper bound of the standard deviation of x, $\sigma_x$, according to X using Eq. 10 is shown in FIG. 5. It may be seen that for $\sigma_x$ to reach $\sigma_R$, X has to be greater than 43 and less than 212. As described above, since the range of the standard deviation is determined according to the average of pixel values, adjusting the range of pixel values is inevitable to reach the target standard deviation $\sigma_R$.

While the range of $I_o$ that expresses a secret image is adjusted to reach the target standard deviation, the range of $I_e$ for concealing the secret image is not adjusted to increase the entropy of pixel values and to cover a wider range of the standard deviation. The upper bound of $\sigma_x$ is symmetric with respect to E(X) as shown in FIG. 5. At this time, it is important not to make the distribution of pixel values skewed due to adjustment of the pixel value range. Therefore, the range of a pixel value is adjusted from [0, 255] to [E(X)−t, E(X)+t] so that the upper and lower bounds have the same distance of t from E(X). t is the intensity strength that controls the range of the image pixel value, and the range of t is [0, 255−E(X)].

$X_o(i)$ and $X_e(i)$ are defined as the i-th pixel value from $X_o$ and $X_e$, respectively. In this case, $X_o(i)$ and $X_e(i)$ are defined by Eq. 11 below.

$$X_o(i) = \mathbb{E}(X) + \alpha_i \text{ and } X_e(i) = \mathbb{E}(X) + \beta_i, \quad [\text{Eq. 11}]$$

In Eq. 11, $\alpha_i \in [-t, t]$ and $\beta_i \in [-E(X), 255-E(X)]$. If the size of $B_I$ is assumed to be 2N, sizes of $B_o$ and $B_e$ are N, respectively.

To satisfy $\overline{X}_I = \mu R$, the value of $\Sigma\alpha_i + \Sigma\beta_i$ has to be 0. When $\rho\alpha_i = k$, the range of k is [−Nt, Nt]. When k is a positive integer belonging to the range of [0, Nt], the upper and lower bounds of the standard deviation, $\sigma_I$, according to t and k are calculated by Eq. 12 below.

$$\frac{|k|}{N} \leq \sigma_I \leq \sqrt{\frac{N-1}{2N}(t^2 + m^2) + \frac{(k-\phi t)^2}{2N} + \frac{(k-\psi m)^2}{2N}}, \quad [\text{Eq. 12}]$$

In Eq. 12, $\varphi = 2 \cdot [k/2t] + 1$, and $\phi = 2 \cdot [k/2m] + 1$. N is a multiple of 2, and m is equal to E(X). Even when k is a negative integer, the upper and lower bounds are the same. When N=4, the upper and lower bounds of the standard deviation, $\sigma_I$, according to t and k are shown in FIGS. 6A and 6B.

Figure 6A:
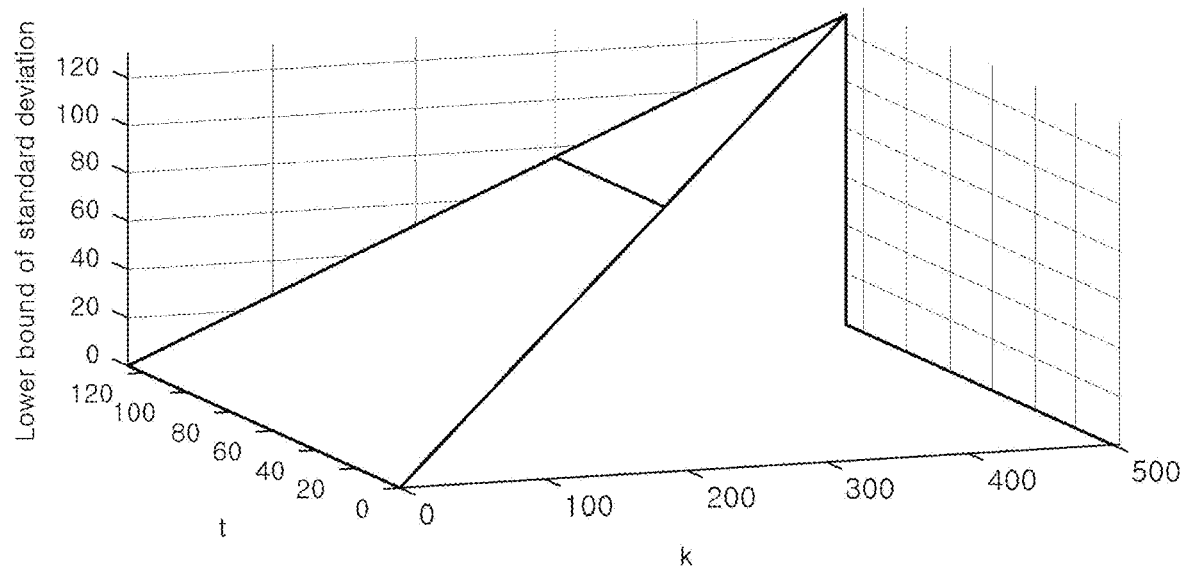
FIGS. 6A and 6B show graphs of the lower and upper bounds of the standard deviation in the restricted viewing scheme of an image encryption method based on line interlacing characteristics according to one embodiment of the present disclosure.
Figure 6B:
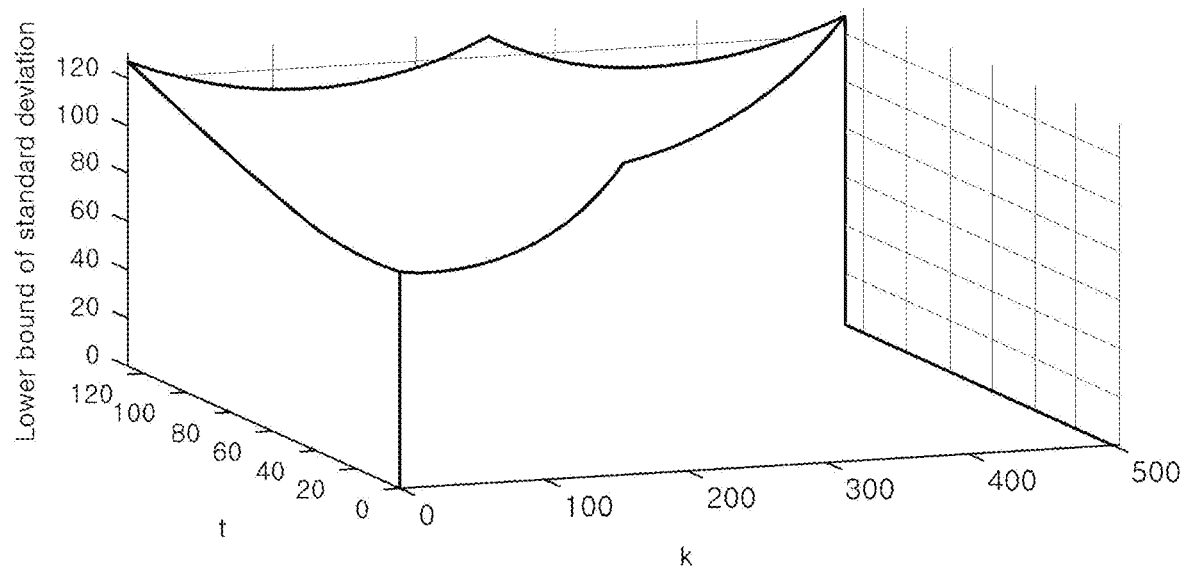

In FIGS. 6A and 6B, the region of $\sigma_I$ less than $\sigma_R$ corresponds to the region under the line. inf $\sigma_I$, the infimum of $\sigma_I$, is t when k=±Nt. Since inf $\sigma_I$ has to be less than $\sigma_R$, t has to be less than $\sigma_R$. A secret image of which the range of a pixel value has been adjusted as described above is defined as an adjusted secret image S'.

Afterward, pixel modulation is repeatedly performed on the adjusted secret image S' in block units to generate a modulated image $M_S$.

Specifically, after intensity adjustment of the secret image, $I_e$ is constructed by performing pixel modulation to achieve the target $\overline{X}_I$ and $\sigma_I$. The average $\overline{X}_o$ and the standard deviation $\sigma_o$ of $B_o$ for $I_o$ in which the adjusted secret image S' is concealed may be expressed by Eq. 13.

$$\overline{X}_o = \overline{X}_{s'}, \text{ and } \sigma_o = \sigma_{s'}. \quad [\text{Eq. 13}]$$

Equation 14 expresses the target $\overline{X}_e^T$ and $\sigma_e^T$ of $\overline{X}_e$ and $\sigma_e$ using Eqs. 11 and 12.

$$\overline{X}_e^T 2\mu_R - \overline{X}_e,$$

$$\sigma_e^T = \sqrt{2\sigma_R^2 - \sigma_o^2 - 2(\overline{X}_o - \mu_R)^2}. \quad [\text{Eq. 14}]$$

$X_e$ is obtained from Eq. 15 by random sampling of Y with a sample size of N following a uniform distribution in the range [0, 1].

$$X_e = qY + r, \quad [\text{Eq. 15}]$$

In Eq. 15, Y~U(0, 1), $q = \sigma_e^T/\sigma_Y$, and $r = \overline{X}_e^T - \overline{Y}\sigma_e^T/\sigma_Y$. After $X_e$ is converted into a block $B_e$ of size (m×n), $B_i$ is constructed by performing line interlacing on the two blocks $B_o$ and $B_e$. Then, as shown in Eq. 16, it is checked whether the average $\overline{X}_I$ and the standard deviation $\sigma_I$ of $X_I$ are within a range of a predefined threshold.

$$\mu_R - \tau_\mu \leq \overline{X}_I \leq \mu_R + \tau_\mu$$

$$\sigma_R - \tau_\sigma \leq \sigma_I \leq \sigma_R + \tau_\sigma \quad [\text{Eq. 16}]$$

If $\overline{X}_I$ and $\sigma_I$ get out of the range, pixel modulation of $B_e$ is repeated until they fall again within the range. An image $I_e$ generated using pixel modulation as described above is defined as a modulated image $M_S$.

In other words, to describe the overall process of the RVS, first, the intensity range is adjusted to be the same for each RGB channel of a secret image S. Then, an adjusted image $M_S$ is generated by repeating pixel modulation in block units based on the adjusted secret image S'. Finally, an interlaced image I, which visually conceals the secret image, is obtained by performing line interlacing on S' and $M_S$.

FIG. 5 illustrates an upper bound of the standard deviation with respect to the average for adjusting an intensity range in the restricted viewing scheme of an image encryption method based on line interlacing characteristics according to one embodiment of the present disclosure.

FIGS. 6A and 6B show graphs of the lower and upper bounds of the standard deviation in the restricted viewing scheme of an image encryption method based on line interlacing characteristics according to one embodiment of the present disclosure.

Specifically, FIGS. 6A and 6B show the lower and upper bounds of the standard deviation of $X_I$ according to t and k in the restricted viewing scheme, where FIG. 6A is a graph showing the lower bound and FIG. 6B is a graph showing the upper bound.

FIGS. 7A-7D show examples of images processed by the restricted viewing scheme of an image encryption method based on line interlacing characteristics according to one embodiment of the present disclosure.

Figure 7A:
FIGS. 7A-7D show examples of images processed by the restricted viewing scheme of an image encryption method based on line interlacing characteristics according to one embodiment of the present disclosure.

FIG. 7A shows the S//B image obtained by interlacing the original secret image S and a black image B.

Figure 7B:
Figure 7C:
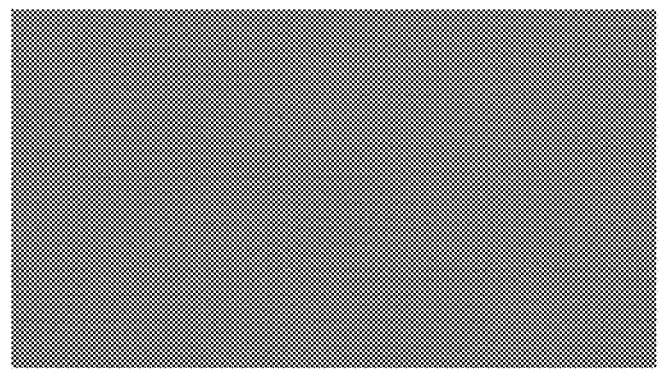
Figure 7D:

The upper half of FIG. 7B shows an adjusted secret image S', and the lower half a modulated image $M_S$. FIG. 7C represents a non-glasses view $V_{ng}$, an image obtained by line interlacing of S' and $M_S$ of FIG. 7B, and FIG. 7D represents a glasses view $V_g$ viewing FIG. 7C through polarized glasses.

Figure 8:
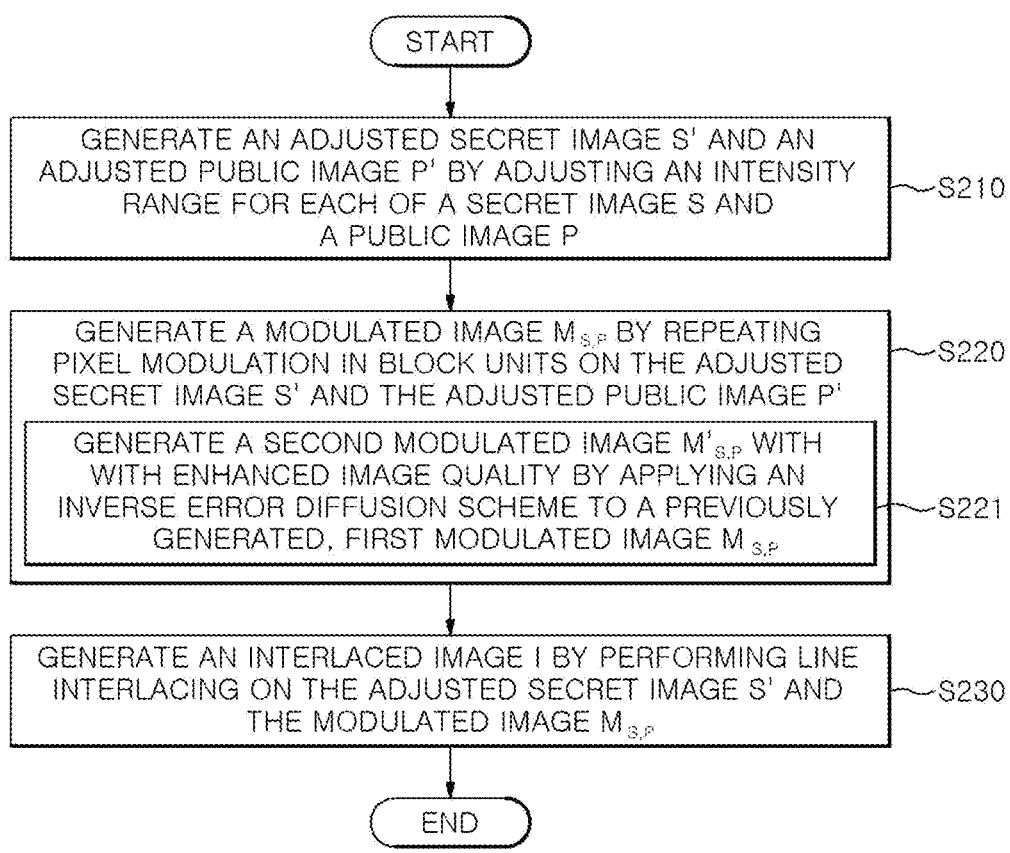
FIG. 8 is a flow diagram illustrating an image encryption method based on line interlacing characteristics according to another embodiment of the present disclosure.

FIG. 8 is a flow diagram illustrating an image encryption method based on line interlacing characteristics according to another embodiment of the present disclosure.

Referring to FIG. 8, an image encryption method based on line interlacing characteristics according to another embodiment of the present disclosure is performed by a processor. In the S210 step, a secret image S and a public image P are adjusted to have the same intensity range for each RGB channel to generate an adjusted secret image S' and an adjusted public image P'.

Here, a public image P refers to an image to which an image enhancement scheme has been applied to enhance edge components.

Here, the generating an adjusted secret image S' and an adjusted public image P' by adjusting the intensity range S210 adjusts the range of a pixel value by considering the correlation between the intensity strength $t_s$ of the secret image S and the intensity strength $t_p$ of the public image P.

In the S220 step, a modulated image $M_{S,P}$ is generated by repeating pixel modulation in block units on the adjusted secret image S' and the adjusted public image P'.

Here, the generating a modulated image $M_{S,P}$ S220 includes generating a second modulated image $M'_{S,P}$ with enhanced image quality by applying an inverse error diffusion scheme to the previously generated, first modulated image $M_{S,P}$ S221.

Here, the generating a modulated image $M_{S,P}$ by repeating pixel modulation in block units on the adjusted secret image S' and the adjusted public image P' S220 calculates pixel values for a particular block located within a preconfigured range in the adjusted secret image S' and the adjusted public image P' and performs pixel modulation for each block of the adjusted secret image S' and the adjusted public image P' based on the pixel values of the particular block.

Specifically, pixel modulation is performed for each block so that the average of pixel values of the particular block located within a preconfigured range falls within a target average range.

In the S230 step, an interlaced image I is generated by interlacing odd- or even-numbered rows of the adjusted secret image S' and even- or odd-numbered rows of the modulated image $M_{S,P}$.

The selective viewing scheme will be described in more detail with reference to FIG. 9.

FIG. 9 illustrates a selective viewing scheme of an image encryption method based on line interlacing characteristics according to yet another embodiment of the present disclosure.

Since a non-glasses view expresses a public image, the selective viewing scheme (SVS) lets a secret image and a public image viewed selectively through polarized glasses. As a result, as shown in Eq. 17 below, a non-glasses view approximates a public image, and at the same time, a glasses view approximates a secret image.

$$V_{ng}=S'//M'_{s,p} \approx P,$$

$$V_g=S'//B \approx s, \quad \text{[Eq. 17]}$$

In Eq. 17, P represents a public image that anyone may see without wearing polarized glasses.

To meet the selective viewing conditions, the restricted viewing scheme is modified so that the average of block $B_I$ in an interlaced image follows the average of block $B_p$ in a public image. In other words, as shown in Eq. 18, the distribution of $X_I$ has to be modified so that the average $\overline{X}_I$ and the standard deviation $\sigma_I$ follow the average $\overline{X}_p$ and the standard deviation $\sigma_R$.

$$X_I \sim (\overline{X}_p, \sigma_R^2), \quad \text{[Eq. 18]}$$

In Eq. 18, it is assumed that I and P have the same size. $B_p$ represents a block in a public image P, which has the same size as the block $B_I$, and $X_p$ represents the pixel value of $B_p$. Therefore, to make $X_I$ follow a target distribution, $X_I$ has to be constructed by generating $X_e$ to minimize modification of $X_o$ and conceal a secret image while expressing a public image simultaneously as in the restricted viewing scheme.

An image encryption method based on line interlacing characteristics according to yet another embodiment of the present disclosure generates an adjusted secret image S' and an adjusted public image P' by adjusting the intensity range and adjusts the range of a pixel value by considering the correlation between the intensity strength $t_s$ of the secret image S and the intensity strength $t_p$ of the public image P.

Since only $\sigma_e$ is a variable in Eq. 7, the upper and lower bounds of $\sigma_I$ are expressed by Eq. 19 below.

$$L(\sigma_I) = \sqrt{\frac{1}{2}\sigma_o^2 + (\overline{X_o} - \overline{X_I})^2},$$

$$U(\sigma_I) = \sqrt{\frac{1}{2}\{\sigma_o^2 + \overline{X_o^2} - 2\overline{X_I^2} + \max\overline{X_e^2}\}}. \quad \text{[Eq. 19]}$$

In Eq. 19, max $\overline{X}_e^2$ is equal to the case of Eq. 10 in which max $\overline{X}^2 = (2\overline{X}_I - \overline{X}_o)$.

FIGS. 10A-10D show the upper and lower bounds of the standard deviation $\sigma_I$ according to the average $\overline{X}_o$ and the standard deviation $\sigma_o$ when $\overline{X}_I$=127.5 and $\overline{X}_I$=202.5. In FIGS. 10A-10D, the area filled with red color represents the area in which $\sigma_I$ is less than $\sigma_R$. In the graph showing the lower bound, the area filled with red color represents a coverage area, the area of $X_o$ in which $\sigma_I$ may reach $\sigma_R$. On the other hand, the red area in the graph showing the upper bound indicates a hole area, the area of $X_o$ in which $\sigma_I$ is unable to reach $\sigma_R$. As $X_I$ becomes distant away from 127.5, the coverage area diminishes, and the hole area increases. Therefore, to satisfy the selective viewing conditions, the range of $X_p$ has to be adjusted to limit the range of $X_I$.

The range of $X_s$ is adjusted by Eq. 20 in the same way as in the restricted viewing scheme.

$$X_s \in [0,255] \rightarrow X_s \in [\mu_R - t_s, \mu_R + t_s], \quad [\text{Eq. 20}]$$

In Eq. 20, $t_s \in [0, 127.5]$ represents the intensity strength of a secret image S. To prevent pixel values from being unequally distributed, the range of a public image P is adjusted by Eq. 21 as in an adjusted secret image S'.

$$X_p \in [0,255] \rightarrow X_p \in [\mu_R - t_p, \mu_R + t_p], \quad [\text{Eq. 21}]$$

In Eq. 21, $t_p \in [0, 127.5]$ represents the intensity strength of a public image P. Since $X'_s$ and $X'_p$ are the same as $X_o$ and $X_I$, the range of $X_e$ may be expressed by Eq. 22.

$$X_e \in [\mu_R - 2t_p - t_s, \mu_R + 2t_p + t_s], \quad [\text{Eq. 22}]$$

Since the range of a pixel value may be limited to [0, 255], the relationship between $t_p$ and $y_s$ may be derived using Eq. 22, as shown in Eq. 23 below.

$$2t_p + t_s \leq 127.5. \quad [\text{Eq. 23}]$$

$\sigma_e$ may be expressed in terms of $X'_p$ and $X'_s$ using Eq. 7, which may be further expressed in terms of $t_p$ and $t_s$ as shown in Eq. 24.

$$\sigma_e = \sqrt{2\sigma_R^2 - \sigma_{s'}^2 - 2(\overline{X_{s'}} - \overline{X_{p'}})^2} \quad [\text{Eq. 24}]$$

$$= \sqrt{2\sigma_R^2 - \left(\frac{2\sigma_s}{255}t_s\right)^2 - 2\left\{\left(1 - \frac{2\overline{X_p}}{255}\right)t_p + \left(\frac{2\overline{X_s}}{255} - 1\right)t_s\right\}^2}.$$

$\sigma_e$ defined above has to satisfy Eq. 25.

$$0 \leq \sigma_e \leq U(\sigma_e; \overline{X}_e), \quad [\text{Eq. 25}]$$

Since $\sigma_e$ satisfies the condition above, $U(\sigma_e; \overline{X}_e) = U(\sigma_e; 2\overline{X}_p - \overline{X}_s)$.

Therefore, to satisfy the selective viewing conditions, $t_p$ and $t_s$ have to be set to satisfy the two conditions expressed by Eqs. 23 and 25.

Afterward, pixel modulation is repeatedly performed on the adjusted secret image S' and the adjusted public image P' in block units to generate a modulated image $M_{S,P}$.

Specifically, after intensity adjustment of the secret image and the public image, $I_e$ is constructed by performing pixel modulation to achieve the target $\overline{X}_I$ and $\sigma_I$. The average $\overline{X}_o$ and the standard deviation $\sigma_o$ of $B_o$ may be expressed by Eq. 13 above in the same manner as in the RVS scheme.

To satisfy the selective viewing conditions, $X_e$ is randomly sampled using $\overline{X}_e^T$ and $\sigma_e^T$ as expressed by Eq. 15.

Then, it is checked whether $\overline{X}_I$ and $\sigma_I$ are stayed within the range of $\tau_\mu$ and $\tau_\sigma$. If $\overline{X}_I$ and $\sigma_I$ get out of the range, pixel modulation is repeated until they fall again within the range. An image $I_e$ generated using pixel modulation as described above is defined as a modulated image $M_{S,P}$.

Here, a second modulated image $M'_{S,P}$ with enhanced image quality may be generated by applying an inverse error diffusion scheme to the previously generated, first modulated image $M_{S,P}$.

Specifically, since the SVS approximates a public image in block units to conceal a secret image, the image quality of an interlaced image expressing the public image is degraded. Therefore, the embodiment of the present disclosure may use an inverse error diffusion (IED) scheme to improve the image quality of an interlaced image.

First, the error diffusion scheme is a simple and efficient image dithering algorithm proposed to improve image quality degradation encountered during image quantization. As shown in Eq. 26 below, the quantization error of a pixel value is spread to adjacent pixels, and a modified pixel value is again fed back to the input, propagating the error in the lower right direction.

$$y(i, j) = x(i, j) - \sum_{k,l} h(k, l)e(i - k, j - l + 1), \quad [\text{Eq. 26}]$$

In Eq. 26, x and y represent the pixel values of an input image and an output image, respectively, h represents an error filter with a size of (h×l), and e represents the quantization error obtained by e=x−y. Since the TED scheme reduces distortions in the low-frequency components of the input image, image quality degradation due to image quantization may be effectively improved.

The IED scheme according to an embodiment of the present disclosure, instead of the quantization error used in the conventional error diffusion schemes, applies an inverse error obtained by inversion of the quantization error.

Thus, rather than reducing the difference between low-frequency components of the input and output images, the difference is increased to relax the range of pixel values while concealing a secret image. In addition, unlike the existing error diffusion schemes, the inverse error is propagated only to $I_e$ to prevent the degradation of the image quality of the secret image. The modulated image $M'_{S,P}$ generated through the inverse error diffusion scheme is calculated by Eq. 27.

$$M'_{S,P}(i, j) = \quad [\text{Eq. 27}]$$

$$M_{S,P}(i, j) - \sum_l h(0, l)e_o(i, j - l + 1) - \sum_l h(1, l)e_e(i, j - l + 1),$$

In Eq. 27, $e_o = -(I_o - P_o)$ and $e_e = -(M_{S,P} - P_e)$.

In the equation above, $P_o$ and $P_e$ represent images composed of only odd- and even-numbered rows of P, respectively, and h represents an error filter. $e_o$ represents an inverse error between $I_o$ and $P_e$, and $e_e$ represents an inverse error between $M_{S,P}$ and $P_e$. FIGS. 11A-11F show an image enhancement effect obtained by applying IED to an interlaced image expressing a public image while keeping concealment of a secret image.

In other words, to describe the overall process of the SVS, first, image enhancement is applied to a public image P to enhance edge components. The intensity range is adjusted to be the same for each RGB channel of the secret image S and the public image P. Then, an adjusted image $M_{S,P}$ is generated by repeating pixel modulation in block units based on S' and P'. $M'_{S,P}$ is generated by applying an inverse error diffusion scheme to $M_{S,P}$ to improve the image quality of P. Finally, an interlaced image I, which expresses P while concealing S is obtained by performing line interlacing on S' and $M_{S,P}$.

FIGS. 10A-10D show graphs of the lower and upper bounds of the standard deviation in the selective viewing scheme of an image encryption method based on line interlacing characteristics according to yet another embodiment of the present disclosure.

Figure 10A:
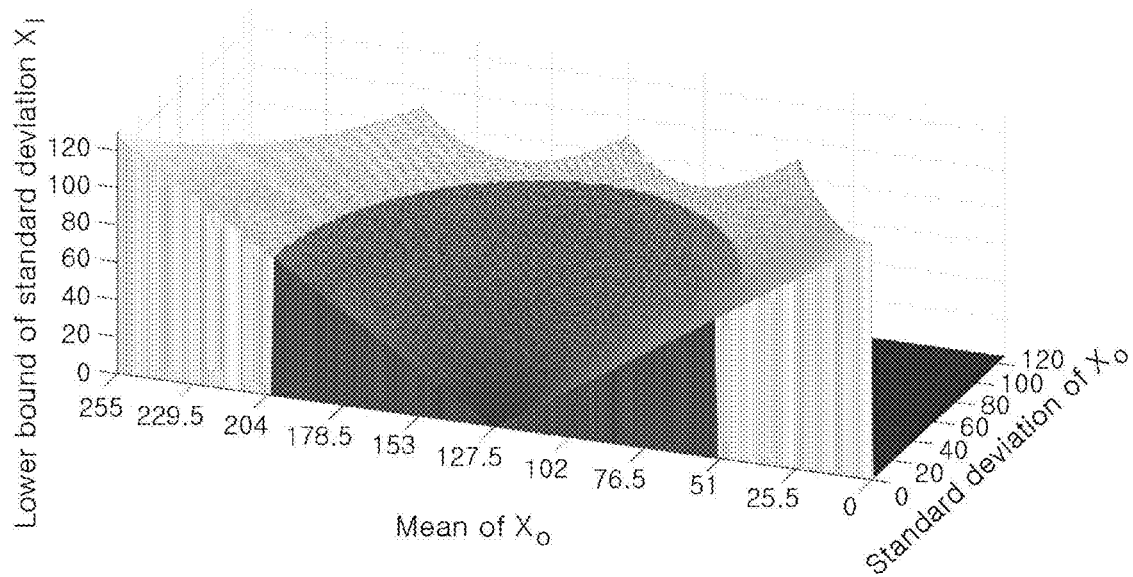
FIGS. 10A-10D show graphs of the lower and upper bounds of the standard deviation in the selective viewing scheme of an image encryption method based on line interlacing characteristics according to yet another embodiment of the present disclosure.
Figure 10B:
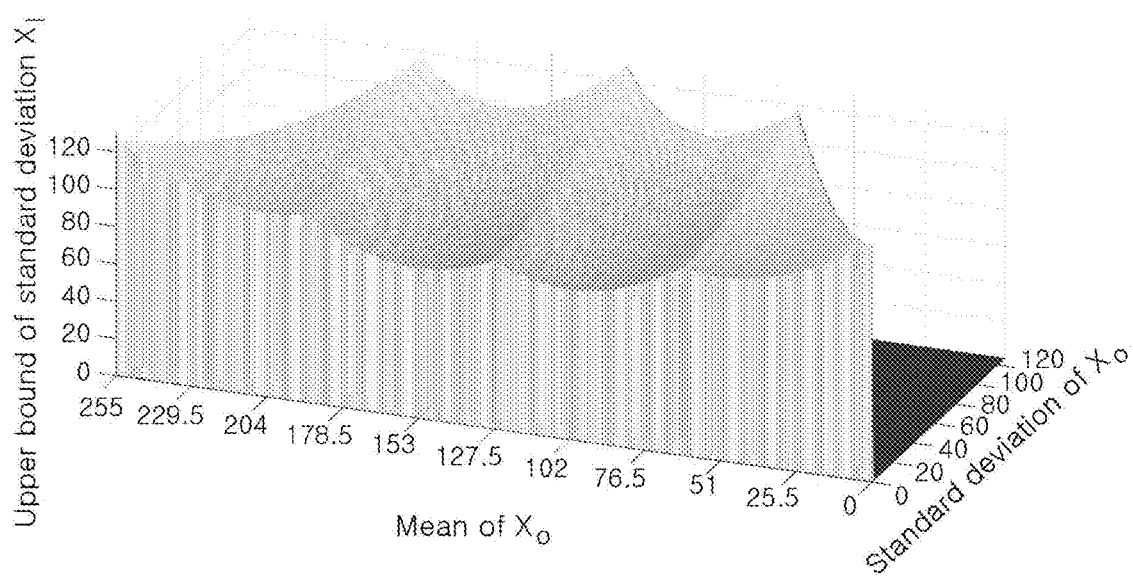
Figure 10C:
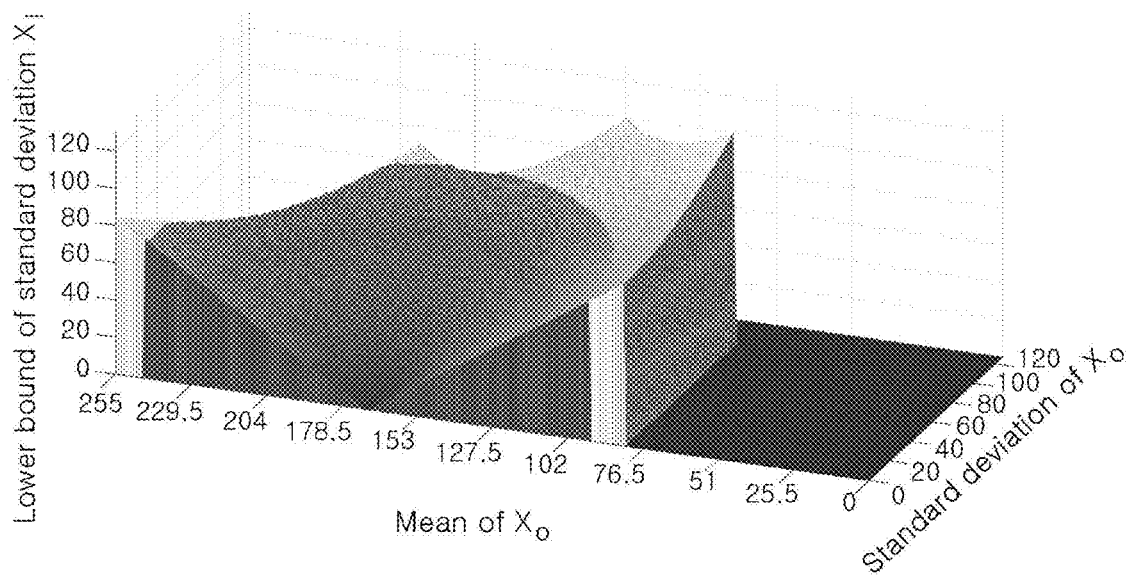
Figure 10D:
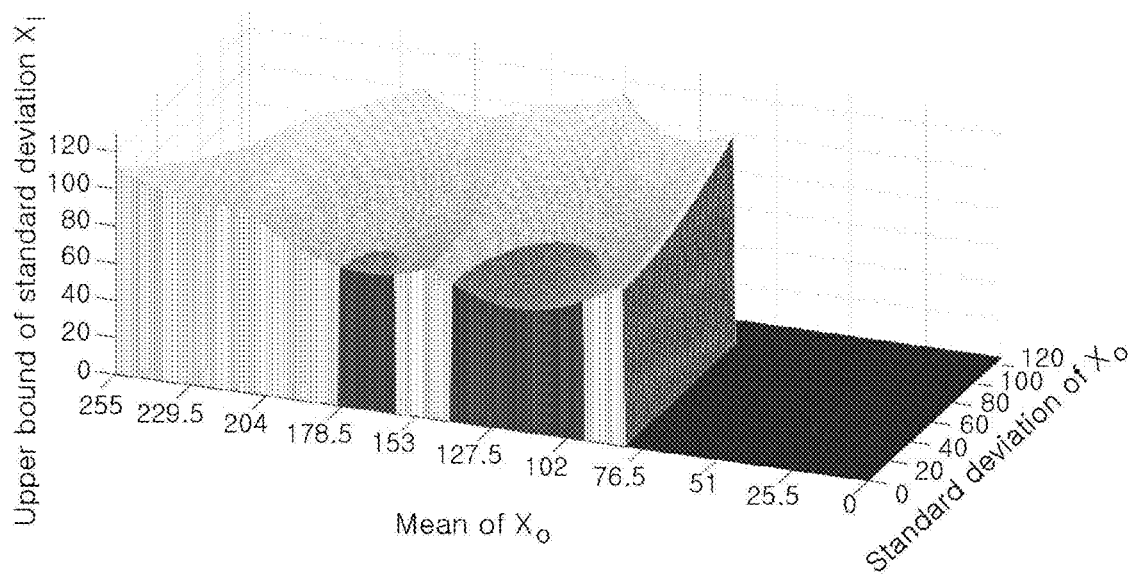

FIGS. 10A-10D show the lower and upper bounds of the standard deviation of $X_I$ according to the average of $X_o$ in the selective viewing scheme; FIGS. 10A and 10B show the graphs of the lowei and upper bounds when $\overline{X}_I=127.5$, and FIGS. 10C and 10D show the graphs of the lower and upper bounds when $\overline{X}_I=170$.

FIGS. 11A-11F show examples of an effect obtained by applying inverse error diffusion in the selective viewing scheme of an image encryption method based on line interlacing characteristics according to yet another embodiment of the present disclosure.

Figure 11A:
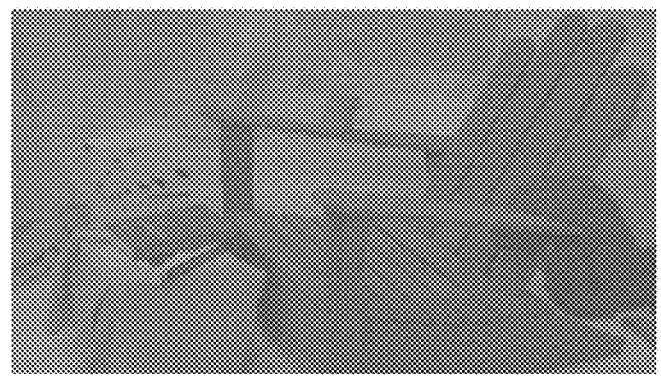
Figure 11B:
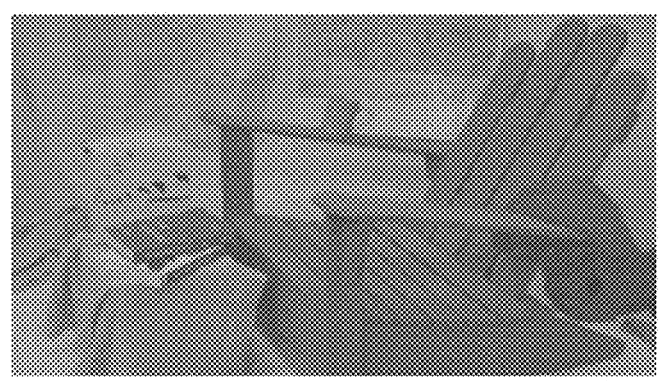

FIG. 11A is a modulated image, and FIG. 11B is a modulated image obtained by applying the inverse error diffusion scheme. FIGS. 11C and 11E show a block magnifying part of FIG. 11A, and FIGS. 11D and 11F show a block magnifying part of FIG. 11B.

FIGS. 12A-12D show examples of images processed by the restricted viewing scheme of an image encryption method based on line interlacing characteristics according to one embodiment of the present disclosure.

Figure 12A:
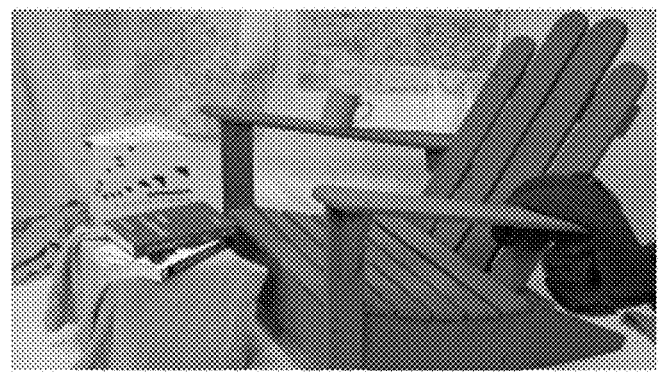
FIGS. 12A-12D show examples of images processed by the restricted viewing scheme of an image encryption method based on line interlacing characteristics according to one embodiment of the present disclosure.
Figure 12B:
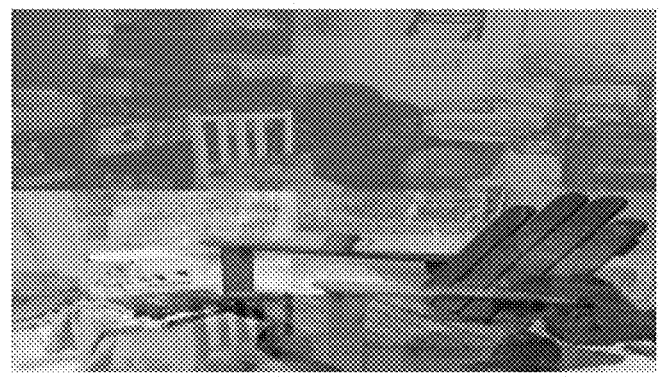
Figure 12C:
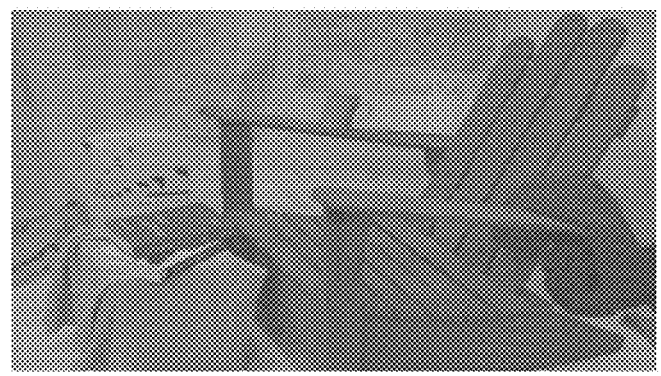
Figure 12D:

FIGS. 12A-12D show examples of images generated by applying the SVS. FIG. 12A is the original public image P, the upper half of FIG. 12B shows an adjusted secret image S', and the lower half of FIG. 12B shows a modulated image $M'_{S,P}$ obtained by applying the inverse error diffusion scheme. FIG. 12C shows a non-glasses view $V_{ng}$ obtained by line interlacing of S' and $M'_{S,P}$ of FIG. 12B, and FIG. 12D shows a glasses view $V_g$ of FIG. 12C seen through polarized glasses.

Figure 13A:
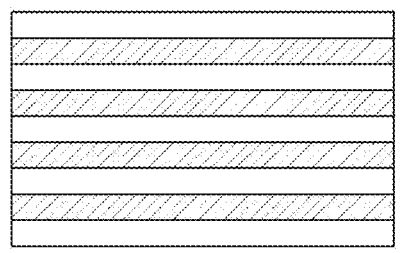
FIGS. 13A and 13B illustrates an image decryption apparatus that decrypts, based on masking, a secret image included through printing on paper such as an identification card, a banknote, and a document according to one embodiment of the present disclosure.
Figure 13B:
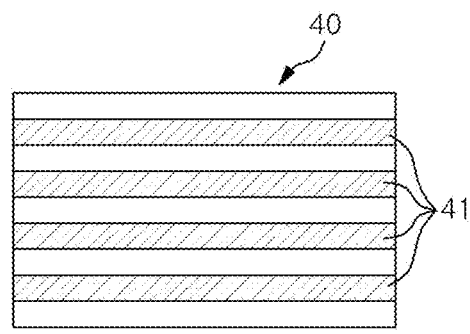

FIGS. 13A and 13B illustrate an image decryption apparatus that decrypts, based on masking, a secret image included through printing on paper such as an identification card, a banknote, and a document according to one embodiment. of the present disclosure. FIG. 13A shows an encryption object that includes an interlaced image, and FIG. 13B shows a decryption screen 40 that may be disposed between the encryption object and viewing positions.

As shown in FIGS. 13A and 13B, the decryption screen 40 may include a mask 41 that prevents viewing at a position corresponding to an even-numbered line or an odd-numbered line of the image. Here, the interlaced image included in the encryption object shown in (a) may be an interlaced image generated by the image encryption method described with reference to FIG. 3 or the image encryption method described with reference to FIG. 8.

In the embodiment of FIGS. 13A and 13B, the mask 41 may be a light blocking filter and may be integrally formed, through a printing technique, on the backside of the encryption object shown in FIG. 13A. In this case, FIG. 13A may be an interlaced image included on the front side of the encryption object integrated with the screen 40, and FIG. 13B may be a light blocking filter included on the backside of the screen 40 integrated with the encryption object. When the front surface of the encryption object is viewed with a light source positioned behind the encryption object for decryption, some lines of the interlaced image included in the encryption object may be masked by the light blocking filter, and only the remaining unmasked lines may be viewed. In other words, the above case may be considered that a secret image has been decrypted.

In another embodiment of FIGS. 13A and 13B, the mask 41 may be a light blocking filter and may be formed, through a printing technique, on the front side or backside of a transparent film. In this case, FIG. 13A may be an interlaced image included on the front side of the encryption object formed separately from the screen 40, and FIG. 13B may be a light blocking filter included on the front or backside of the screen 40 formed separately from the encryption object. When the encryption object is viewed through a transparent film with the encryption object overlapping the transparent film through line alignment for decryption, some lines of the interlaced image included in the encryption object may be masked by the light blocking filter, and only the remaining unmasked lines may be viewed. In other words, the above case may be considered that a secret image has been decrypted.

Comparing the image decryption apparatus according to the embodiment of FIGS. 13A and 13B with the polarized 3D system 1 of FIG. 1, the 3D display 10 may be regarded as corresponding to the encryption object (a) shown in FIG. 13A and the polarized glasses 20 may be regarded as corresponding to the decryption screen 40. Suppose a circular polarization filter is included in place of the light blocking filter of the decryption screen 40. In that case, the encryption object shown in 13A may be referred to as the stereoscopic 3D content 30 shown in FIG. 1.

According to an embodiment of the present disclosure, the proposed method of encrypting an image using line interlacing characteristics may prevent illegal content leakage from recapture of a screen using an imaging device and may also be applied as a security display method. Also, the proposed schemes may be applied to content requiring protection from unauthorized recapture in public places such as public presentations and exhibitions. The proposed schemes may be applied to situations in which two pieces of content are displayed simultaneously on a single display, such as a dual display. In addition, it may be applied for authentication of paper such as an identification card, a banknote, and a document; and as an image encryption scheme for integrity verifcation.

In addition, according to an embodiment of the present disclosure, a computer program stored in a computer-readable storing medium that executes an image encryption method based on line interlacing characteristics may be provided.

In addition, according to an embodiment of the present disclosure, a computer-readable storing medium in which a program forexecuting an image encryption method based on line interlacing characteristics is stored may be provided.

Combinations of each block of the block diagram and each step of the flowchart in the present disclosure may be performed by computer program instructions, Since these computer program instructions may be mounted on an encoding processor of a general-purpose computer, a special purpose computer, or other programmable data processing equipment, a means by which the instructions executed by the encoding processor of the computer or other programmable data processing equipment performs the functions described in each block of the block diagram or each step in the flowchart may be generated. Since these computer program ctions may be stored in computer-usable or computer-readable mmemory that may be directed to the computer or other programmable data processing equipment to implement a function in a particular way, the instructions stored in the computer-usable or computer-readable r emory may produce manufactures including an instruction means for performing the functions described in each block of the block diagram or each step of the flowchart. Since the computer program instructions may be mounted on the computer or other program able data processing equipment, instructions that operate the computer or other programmable data processing equipment by generating a process in which a series of operational steps are performed on the computer or other programmable data processing equipment and executed by the computer may provide steps of performing the functions described in each block of the block diagram and each step of the flowchart.

In addition, each block or each step may represent a part of a module, segment, or code that includes one or more executable instructions for executing specified logical function(s). Further, it Wray be noted that in some alternative embodiments, functions described in blocks or steps may occur regardless of the described order. For example, two blocks or two steps shown in succession may be performed substantially simultaneously, or sometimes be performed in the reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An image encryption method, comprising:
   generating an adjusted secret image by adjusting an intensity range to be the same for each RGB channel of a secret image;
   generating a modulated image by repeating pixel modulation in block units on the adjusted secret image; and
   generating an interlaced image by interlacing odd-numbered lines of the adjusted secret image with even-numbered lines of the modulated image or interlacing even-numbered lines of the adjusted secret image with odd-numbered lines with the modulated image.

2. The method of claim 1, wherein the generating of the adjusted secret image by adjusting the intensity range adjusts the range of a pixel value to have the same distance of intensity strength from the expectation value of a probabilistic variable representing the pixel value of the secret image.

3. The method of claim 2, wherein the generating of the modulated image comprises:
   calculating pixel values of a particular block located within a preconfigured range in the adjusted secret image; and
   performing pixel modulation for each block of the adjusted secret image based on the pixel values of the particular block.

4. The method of claim 3, wherein the performing of pixel modulation for each block of the adjusted secret image performs pixel modulation on each block so that the average value of pixel values of any block located within a preconfigured range falls within a target average range.

5. The method of claim 1, further comprising generating an adjusted public image by adjusting an intensity range to be the same for each RGB channel of the public image, wherein the generating the modulated image generates the modulated image by repeating pixel modulation in block units on the adjusted secret image and the adjusted public image.

6. The method of claim 5, wherein the public image is an image to which an image enhancement scheme has been applied to enhance edge components.

7. The method of claim 5, wherein the generating of the modulated image comprises generating a second modulated image with enhanced image quality by applying an inverse error diffusion scheme to a previously generated, first modulated image.

8. The method of claim 5, wherein, when the intensity range is adjusted, the range of a pixel value is adjusted by considering correlation between intensity strength of the secret image and intensity strength of the public image.

9. The method of claim 5, wherein the generating the modulated image comprises:
   calculating pixel values of a particular block located within a preconfigured range in the adjusted secret image and the adjusted public image; and
   performing pixel modulation for each block of the adjusted secret image and the adjusted public image based on the pixel values of the particular block.

10. The method of claim 9, wherein the performing of pixel modulation for each block of the adjusted secret image and the adjusted public image performs pixel modulation on each block so that the average value of pixel values of any block located within a preconfigured range falls within a target average range.

11. An image decryption apparatus, comprising:
    a decryption screen disposed between an encryption object including an interlaced image and a viewing position,
    wherein the interlaced image is generated by generating an adjusted secret image by adjusting an intensity range to be the same for each RGB channel of a secret image; generating a modulated image by repeating pixel modulation in block units on the adjusted secret image; and
    interlacing odd-numbered lines of the adjusted secret image with even-numbered lines of the modulated image or interlacing even-numbered lines of the adjusted secret image with odd-numbered lines with the modulated image.

12. The apparatus of claim 11, wherein the decryption screen decrypts the adjusted secret image encrypted by even-numbered lines or odd-numbered lines of the interlaced image.

13. The apparatus of claim 12, wherein the decryption screen comprises a mask that prevents viewing at a position corresponding to an even-numbered line or an odd-numbered line of the interlaced image.

14. The apparatus of claim 13, wherein the mask comprises a polarization filter or a light blocking filter.

15. The apparatus of claim 11, wherein, after further generating an adjusted public image by adjusting an intensity range to be the same for each RGB channel of a public image, the modulated image is generated by repeating pixel modulation in block units on the adjusted secret image and the adjusted public image.

16. The apparatus of claim 15, wherein the decryption screen decrypts the adjusted secret image encrypted by even-numbered lines or odd-numbered lines of the interlaced image.

17. The apparatus of claim 16, wherein the decryption screen comprises a mask that prevents viewing at a position corresponding to an even-numbered line or an odd-numbered line of the interlaced image.

18. The apparatus of claim 17, wherein the mask comprises a polarization filter or a light blocking filter.

19. A non-transitory computer-readable storage medium storing a computer program, wherein the computer program, when being executed by a processor, comprises:
   generating an adjusted secret image by adjusting an intensity range to be the same for each RGB channel of a secret image;
   generating a modulated image by repeating pixel modulation in block units on the adjusted secret image; and
   generating an interlaced image by interlacing odd-numbered lines of the adjusted secret image with even-numbered lines of the modulated image or interlacing even-numbered lines of the adjusted secret image with odd-numbered lines with the modulated image.

20. The computer-readable recording medium of claim 19, wherein the image decryption method further comprises generating an adjusted public image by adjusting an intensity range to be the same for each RGB channel of a public image,
   wherein the generating the modulated image generates the modulated image by repeating pixel modulation in block units on the adjusted secret image and the adjusted public image.

* * * * *